United States Patent
Smith et al.

(10) Patent No.: US 12,071,871 B1
(45) Date of Patent: Aug. 27, 2024

(54) POSITIVE PRESSURE AIR CLEANING APPARATUS FOR A CRANKCASE VENTILATION SYSTEM

(71) Applicant: Caterpillar Inc., Peoria, IL (US)

(72) Inventors: Lucas K. Smith, Lafayette, IN (US); Rodney Allen Lawrence, Frankfort, IN (US); Eric W. Ferguson, Cottage Grove, MN (US); Ryan R. Stoneman, Hopkins, MN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/208,525

(22) Filed: Jun. 12, 2023

(51) Int. Cl.
| | |
|---|---|
| F01M 1/04 | (2006.01) |
| B01D 46/00 | (2022.01) |
| B01D 46/24 | (2006.01) |
| B01D 46/88 | (2022.01) |
| F01M 13/00 | (2006.01) |

(52) U.S. Cl.
CPC ..... *F01M 13/0033* (2013.01); *B01D 46/0004* (2013.01); *B01D 46/0005* (2013.01); *B01D 46/0043* (2013.01); *B01D 46/0046* (2013.01); *B01D 46/0087* (2013.01); *B01D 46/2403* (2013.01); *B01D 46/88* (2022.01); *F01M 13/0011* (2013.01); *B01D 2265/024* (2013.01); *B01D 2271/02* (2013.01); *B01D 2273/30* (2013.01); *B01D 2279/35* (2013.01); *F01M 2013/0044* (2013.01)

(58) Field of Classification Search
CPC ........... F01M 2013/0438; F01M 13/04; F01M 13/00; B01D 46/2414; B01D 46/2411
USPC .................................................. 123/196 CP
See application file for complete search history.

(56) References Cited

U.S. PATENT DOCUMENTS

| | | | |
|---|---|---|---|
| 3,033,030 A | * | 5/1962 | Heller ..................... F02M 35/09 |
| | | | 116/DIG. 25 |
| 3,589,108 A | | 6/1971 | Dingel et al. |
| 4,653,457 A | | 3/1987 | Stege |
| 4,995,891 A | | 2/1991 | Jaynes |
| 6,171,355 B1 | * | 1/2001 | Gieseke ................ B01D 46/521 |
| | | | 55/330 |
| 6,187,073 B1 | * | 2/2001 | Gieseke ............. B01D 46/2411 |
| | | | 55/318 |

(Continued)

FOREIGN PATENT DOCUMENTS

| | | | | |
|---|---|---|---|---|
| DE | 102013005624 A1 | * | 10/2013 | ......... B01D 35/1475 |
| KR | 20210156998 | | 12/2021 | |

*Primary Examiner* — Long T Tran
*Assistant Examiner* — James J Kim
(74) *Attorney, Agent, or Firm* — Schwegman Lundberg & Woessner, P.A.

(57) ABSTRACT

Apparatuses, systems and methods are disclosed including apparatus for a ventilation system for supplying air to a crankcase of an internal combustion engine. The apparatus can optionally include a housing, an air filter, a lid and a pressure relief valve. The housing can form a cavity and having an inlet and an outlet therein. The inlet communicates with the cavity and is offset from a centerline axis of the housing. The air filter can be received by the cavity. An outer circumference of the air filter can be oriented at an angle that is substantially tangent to the inlet. The lid can be attachable to and removable from the housing for selectively accessing the air filter. The pressure relief valve coupled to the housing and in fluid communication with the cavity.

18 Claims, 4 Drawing Sheets

(56) References Cited

U.S. PATENT DOCUMENTS

| | | | |
|---|---|---|---|
| 7,406,960 B2* | 8/2008 | Knauf | F01M 13/04 |
| | | | 123/41.86 |
| 8,181,634 B2 | 5/2012 | Spix et al. | |
| 8,342,160 B2* | 1/2013 | Heckel | B01D 46/0008 |
| | | | 123/572 |
| 9,308,481 B2* | 4/2016 | Slaughter | B01D 46/0005 |
| 9,468,871 B2* | 10/2016 | Formica | B01D 29/21 |
| 9,650,927 B2 | 5/2017 | Subedi et al. | |
| 9,909,470 B2 | 3/2018 | Christian et al. | |
| 10,864,469 B2 | 12/2020 | Campbell et al. | |
| 10,875,445 B2 | 12/2020 | Ludwig et al. | |
| 10,876,445 B2* | 12/2020 | Kress | F01M 13/028 |
| 11,724,220 B2* | 8/2023 | Ouweleen | B01D 46/24 |
| | | | 210/232 |
| 2011/0258975 A1* | 10/2011 | Lundgren | B01D 46/0005 |
| | | | 55/357 |
| 2014/0033668 A1* | 2/2014 | Kleynen | B01D 29/21 |
| | | | 55/502 |
| 2014/0208702 A1* | 7/2014 | Lundgren | B01D 46/4227 |
| | | | 55/357 |
| 2015/0090651 A1* | 4/2015 | Kotale | B01D 27/08 |
| | | | 210/450 |
| 2018/0021715 A1* | 1/2018 | Melde | B01D 46/003 |
| | | | 55/312 |
| 2020/0324237 A1 | 10/2020 | Moers et al. | |

\* cited by examiner

POSITIVE PRESSURE AIR CLEANING APPARATUS FOR A CRANKCASE VENTILATION SYSTEM

TECHNICAL FIELD

The present disclosure relates to internal combustion engines such as those for vehicles or stationary power generation. More particularly, the present disclosure relates to an air cleaning apparatus for a crankcase ventilation system for an internal combustion engine.

BACKGROUND

Machinery, for example, agricultural, industrial, construction or other heavy machinery can be propelled by an internal combustion engine(s). Internal combustion engines can be used for other purposes such as for power generation. Internal combustion engines combust a mixture of air and fuel in cylinders and thereby produce drive torque and power. Internal combustion engines typically include a crankcase to provide a housing for a crankshaft of the engine. A portion of the combustion gases (termed "blow-by") may escape the combustion chamber past the piston and enter undesirable areas of the engine such as the crankcase. Blow-by can contain hydrogen (an explosive gas) and potentially corrosive chemicals such as hydrogen sulfide and hydrogen sulfide biproducts like sulfur dioxide. In rare cases, un-combusted fuel and/or explosive gases can build within the engine such as within the crankcase. The explosive gases and corrosive chemicals can result in deleterious side effects such as explosion or corrosion if not properly mitigated using a crankcase ventilation system. Crankcase ventilation systems are known in internal combustion engines to vent blow-by gases within the crankcase. For example, U.S. Pat. Nos. 3,589,108, 4,653,457, 4,995,891, 9,909,470 and 10,875,445 disclose examples of crankcase ventilation systems. However, these patents do not provide an air cleaning apparatus in the manner disclosed herein.

Summary

In an example according to this disclosure, an apparatus for a ventilation system for supplying air to a crankcase of an internal combustion engine. The apparatus can optionally include a housing, an air filter, a lid and a pressure relief valve. The housing can form a cavity and having an inlet and an outlet therein. The inlet communicates with the cavity and is offset from a centerline axis of the housing. The air filter can be received by the cavity. An outer circumference of the air filter can be oriented at an angle that is substantially tangent to the inlet. The lid can be attachable to and removable from the housing for selectively accessing the air filter. The pressure relief valve coupled to the housing and in fluid communication with the cavity.

In another example according to this disclosure, a method of servicing an air filter for supplying air to a crankcase of an internal combustion engine is disclosed. The method can include providing a housing forming a cavity and having an inlet and an outlet therein, positioning the air filter within the cavity and at least partially retained by the housing, providing a lid sealed to the housing at least two locations and removing the lid from the housing to access the air filter within the cavity.

In yet another example according to this disclosure, a ventilation system for a crankcase of an internal combustion engine is disclosed. The ventilation system can optionally include: a low pressure, high mass flow air delivery system; an apparatus configured to receive air from the blower, a pressure relief valve and a heat exchanger. The apparatus optionally includes: a housing forming a cavity and having an inlet for receiving the air and an outlet therein, an air filter received by the cavity; and a lid attachable to and removable from the housing for selectively accessing the air filter.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples according to this disclosure are directed to apparatuses for cleaning air used with crankcase ventilation systems for supplying cleaned air to the internal combustion engine to dilute un-combusted fumes, blow-by constituents and/or aerosolized oil within the internal combustion engine. Methods of servicing such apparatuses are also discussed. Examples of the present disclosure are now described with reference to the accompanying drawings. The following description is merely exemplary in nature and is not intended to limit the present disclosure, application, or use. Examples described set forth specific components, devices, and methods, to provide an understanding of embodiments of the present disclosure. It will be apparent to those skilled in the art that specific details need not be employed and that examples may be embodied in many different forms. Thus, the examples provided should not be construed to limit the scope of the claims.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±15% in a stated value.

Figure 1:
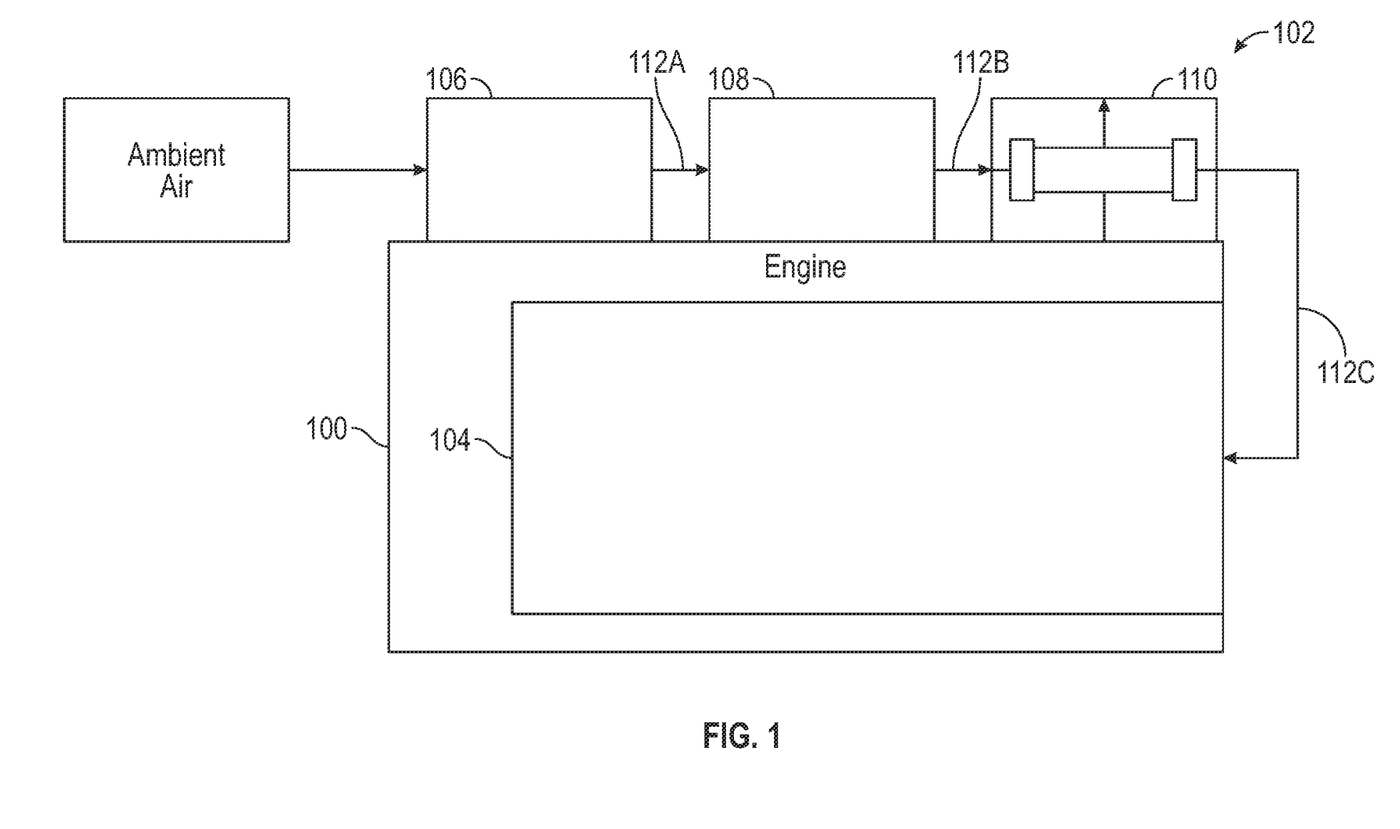
FIG. 1 is a highly schematic illustration of an example internal combustion engine including a crankcase and a ventilation system for the crankcase in accordance with an example of this disclosure.

FIG. 1 depicts in a highly schematic manner of an internal combustion engine 100 (sometimes referred to as "engine" herein for simplicity) in accordance with this disclosure. The engine 100 can be used for power generation such as for the propulsion of vehicles or other machinery or for stationary power generation. The engine 100 can include various power generation platforms, and can use fuel including, for example, gasoline, gaseous fuel, diesel or blends thereof. Stationary engines may be used to drive immobile equipment, such as pumps, generators, mills, or factory equipment. In one embodiment, the engine 100 can be used in landfill applications for generating electricity. As such, the engine 100 may employ gaseous fuel. As used herein, "gaseous fuel" may include fuel that is supplied to the engine 100 in gaseous form and can include, for example, propane, natural gas, gas associated with natural gas such as bio-gas, landfill gas, carbon monoxide, hydrogen, hydrogen sulfide, or mixtures thereof. The fuel may have different levels of purity. As used herein, natural gas refers to both pure and relatively impure forms having various amounts of methane and other constituents. It is understood that the present disclosure can apply to any number of piston-cylinder arrangements and a variety of engine configurations including, but not limited to, V-engines, inline engines, and horizontally opposed engines, as well as overhead cam and cam-in-block configurations.

In some applications, the internal combustion engine disclosed herein is contemplated for use in gas compression. The internal combustion engines can employ a low pressure fuel delivery system where fuel is introduced at a turbocharger/compressor inlet. Thus, the fuel can be mixed all the way through the engine. The internal combustion engine 100 can be used in stationary applications as discussed above but also can be used with vehicles and machinery that include those related to various industries, including, as examples, construction, agriculture, forestry, transportation, material handling, waste management, etc.

The engine 100 can include an on-engine or off-engine (or partially on-engine and partially off-engine) ventilation system 102 for a crankcase 104. The ventilation system 102 can include a low pressure, high mass flow air delivery system 106, an air cleaning apparatus 108, a heat exchanger 110 and passages 112A, 112B and 112C.

Figure 5:
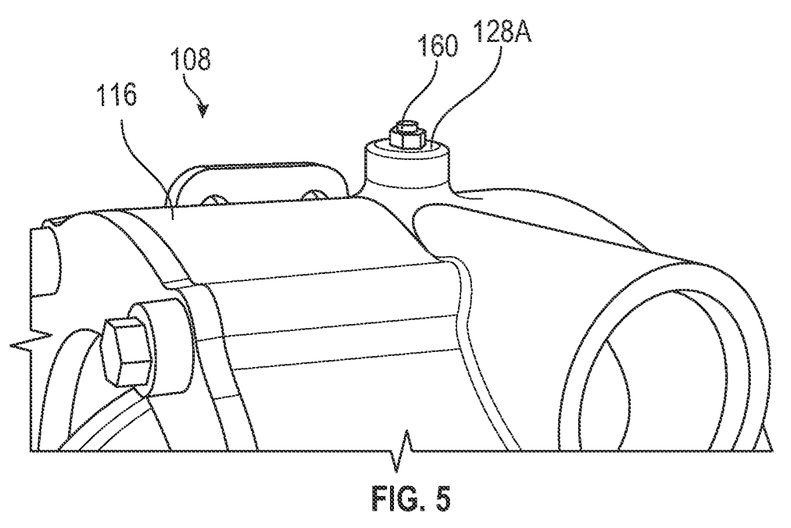
FIG. 5 is a perspective view of an exterior portion including a port of the air cleaning apparatus of FIGS. 3-4B with a pressure relief valve in accordance with an example of this disclosure.

The passages 112A, 112B and 112C that allow for fluid communication between the low pressure, high mass flow air delivery system 106, the air cleaning apparatus 108, the heat exchanger 110 and the crankcase 104. Although not illustrated in FIG. 1, it is recognized that the ventilation system 102 can include valves or other regulators configured to prevent reverse flow when the pressure along the passages 112B and 112C or within the air cleaning apparatus 108 and/or the heat exchanger 110 is lower than the pressure within the crankcase 104. FIG. 5 shows an example of a pressure relief valve 160 for the air cleaning apparatus 108 and the ventilation system 102. However, valves or regulators are not required in all examples as operational criteria such as loads and pressure levels dictate. The terms "passage", "passages", "passageway", "passageways", "line" or "lines" as used herein should be interpreted broadly. These terms can be features defined by the various components of the engine illustrated in the FIGURES or can be formed by additional components (e.g., a hose, tube, pipe, manifold, cavity etc.) as known in the art.

In the example of FIG. 1, components of the ventilation system 102 such as the air cleaning apparatus 108 and the heat exchanger 110 can be mounted to the engine 100. However, it is contemplated that such components may be separate from the engine 100 (e.g., not mounted thereto other than via passage 112C). The ventilation system 102 or some components thereof can be part of the original manufacture of the engine 100 or can be a retrofitted system that is added to the engine 100 during maintenance, upgrade or the like. The ventilation system 102 can be in fluid communication with the crankcase 104 such as via the passages 112A, 112B and 112C. The ventilation system 102 can be configured to supply ambient air or air from a pressurized source to the crankcase 104.

Air for the ventilation system 102 can be collected at an intake to the low pressure, high mass flow air delivery system 106 (e.g., a blower, fan or similar air motive device) and passed along the passage 112A to the air cleaning apparatus 108 to be appropriately cleaned such as via passing through an air filter. The air for the intake can be obtained from atmosphere or another source. From the air cleaning apparatus 108, the air can then pass along the passage 112B to the heat exchanger 110 where it is heated or cooled to a desired temperature range. The air is then passed along the passage 112C at a desired pressure range and a desired mass flow rate range to the engine 100. The desired mass flow rate range can between about 0.002 kg/hr*bkW to 1.02 kg/hr*bkW, for example. However, other ranges for the desired mass flow rate range are contemplated. The mass flow rate range should be sufficient to keep volatiles within sensitive areas such as the crankcase 104 below a lower explosive limit (typically a fuel percentage by volume below 5%). The mass flow rate should not be excessive to avoid the potential for high crankcase pressure.

The low pressure, high mass flow air delivery system 106 can be part of a positive pressure system that can supply air at the desired pressure range to the crankcase 104. The heat exchanger 110 can be an aftercooler or another type of air-to-air or liquid-to-air heat exchanger such as a jacket heat exchanger as known in the art. The heat exchanger 110 can be configured to receive and heat or cool the air to a desired temperature range. The desired temperature range can be between about 80 degrees Celsius and about 120 degrees Celsius, for example. A heat exchanger is not contemplated in all examples. From the heat exchanger 110, the compressed air passes along the passage 112C to the crankcase 104 such as via an intake manifold or other suitable connection.

Apparatuses such as breathers (not shown) can couple directly or indirectly to the engine block, and can be in fluid communication with the crankcase 104. Each of the breathers can comprise a mechanism that separates the oil droplets and oil mist from the blow-by gas in order to prevent the oil droplets and oil mist contained in the blow-by gas from being taken out along the flow of the blow-by gas. By way of example, the breathers can include one or more separation mechanisms such as an oil separation valve, splasher plate, serpentine passage, mesh or other obstruction. The breathers can be an outlet allowing passage of fumes, blow-by constituents and/or aerosolized oil to atmosphere or another location such as away from the engine 100.

Figure 2:
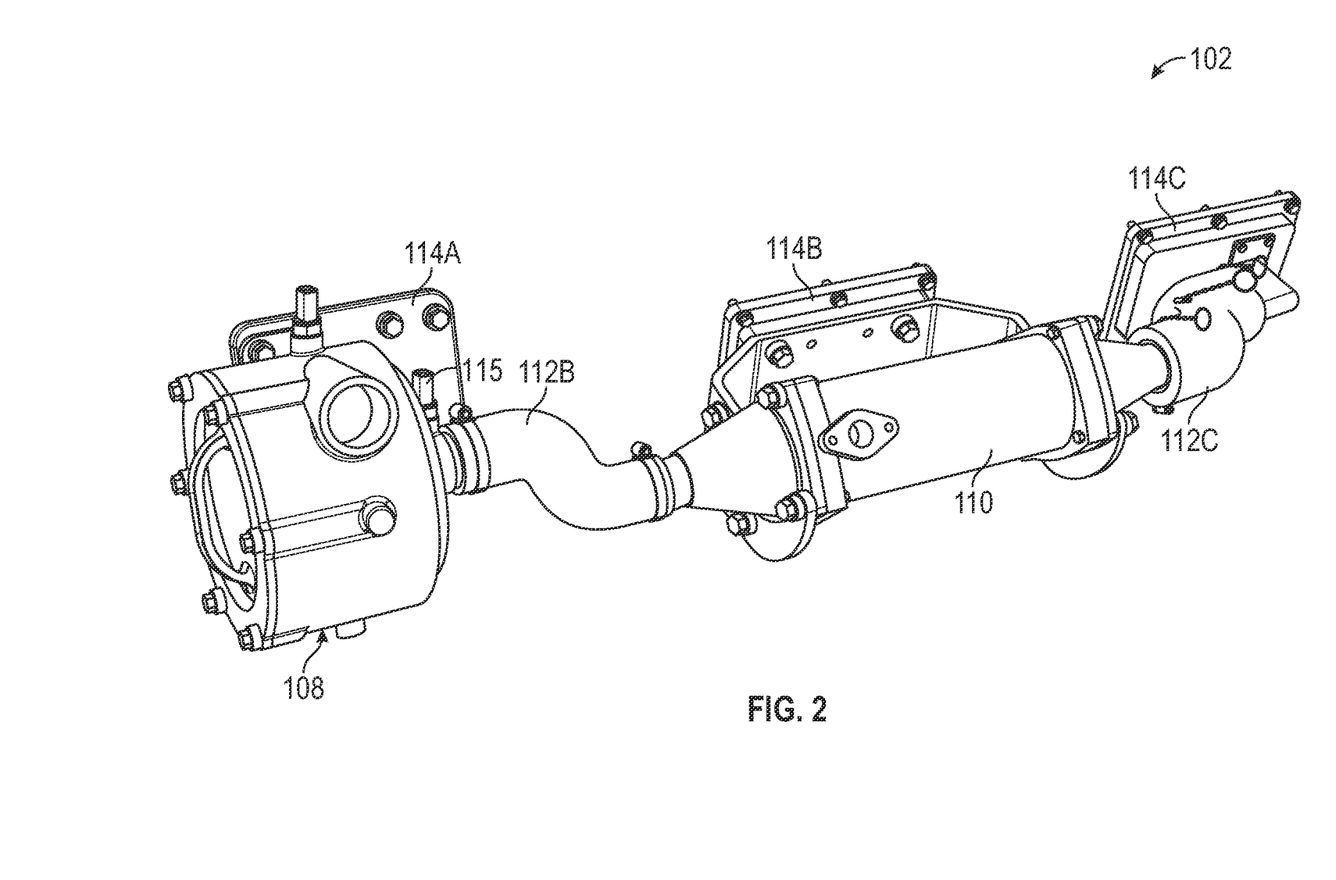
FIG. 2 is a perspective view of the ventilation system for the crankcase including an air cleaning apparatus in accordance with an example of this disclosure.

FIG. 2 is a perspective view of some components of the ventilation system 102 including the air cleaning apparatus 108, the heat exchanger 110 and the passages 112B and 112C. The low pressure, high mass flow air delivery system 106 and the passage 112A (FIG. 1) are not shown in FIG. 2. Mounting apparatuses 114A, 114B and 114C such as flanges and/or brackets can be provided for mounting the air cleaning apparatus 108, the heat exchanger 110 and the passage 112C, respectively, to the engine 100 (FIG. 1) or other objects. A restriction sensor 115 can be coupled to the air cleaning apparatus 108 or the passage 112. The restriction sensor 115 can be used to measure the pressure with respect to the pressure at an inlet of the air delivery system 106 or with respect to ambient in order to ascertain/measure a restriction across a filter of the air cleaning apparatus 108.

Figures 3, 4:
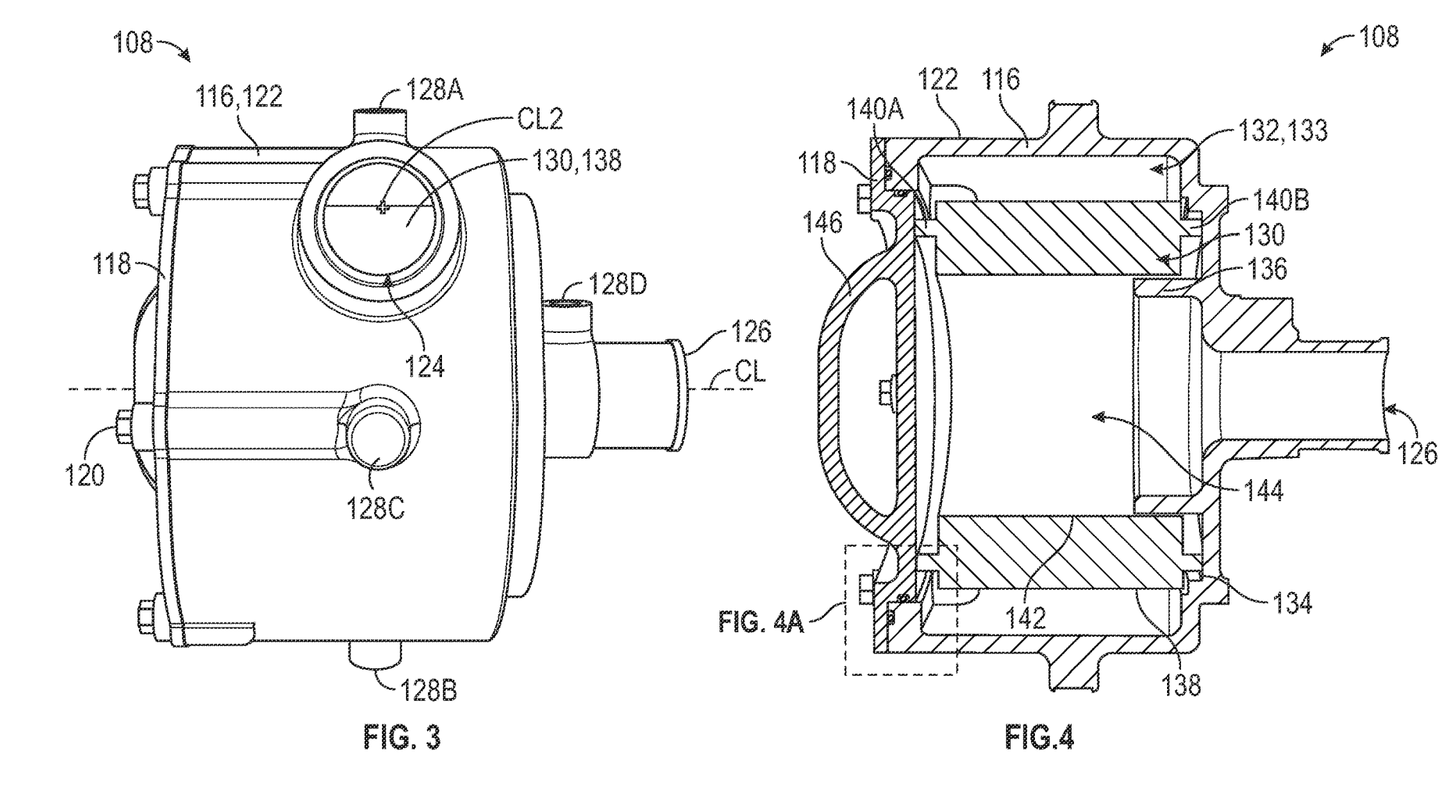
FIG. 3 is a plan view of a side of the air cleaning apparatus of the ventilation system of FIG. 2 in accordance with an example of this disclosure.
FIG. 4 is a cross-sectional view of the air cleaning apparatus of FIG. 3 in accordance with an example of this disclosure.

FIG. 3 shows the air cleaning apparatus 108 in further detail. The cleaning apparatus 108 can include a housing 116, a lid 118 and fasteners 120. The housing 116 can include an outer circumference 122, an inlet 124, an outlet 126 and one or more ports 128A, 128B, 128C and 128D.

The housing 116 can be formed of metal or metal alloy such as aluminum, steel or the like. The housing 116 can have a single piece integral construction, for example. The lid 118 is configured to couple with the housing 116 as at an opening formed thereby. The fasteners 120 can secure the lid 118 to the housing 116. The lid 118 can be formed of a material similar to or identical to that of the housing 116.

The housing 116 can by substantially cylindrically shaped having the outer circumference 122 and a hollow interior (discussed subsequently). The inlet 124 can be configured to couple with the passage 112A (FIG. 1) either directly or indirectly to receive air and can communicate with the interior of the housing 116. The housing 116 can have a centerline axis CL. The outlet 126 can be substantially aligned with the centerline axis CL while the inlet 124 can be offset from the centerline axis CL.

In addition to the inlet 124 and the outlet 126, which pass through the housing 116 to access the hollow interior of the housing 116, the one or more ports 128A, 128B, 128C and 128D can access the interior of the housing 116. The one or more ports 128A, 128B, 128C and 128D can be configured to provide access for equipment such as sensor(s), valve(s), gauges or the like. As an example, the port 128D can provide access at the outlet 126 (or adjacent the outlet 126) and can be used with the restriction sensor 115 (FIG. 2) in order to provide access for the restriction sensor 115 to ascertain/measure the restriction across the air filter (see FIG. 4).

FIG. 4 is a cross-section of the air cleaning apparatus 108 illustrating additional features and components of the interior of the housing 116 such as an air filter 130. FIG. 4 shows the housing 116, the lid 118, the fasteners 120, the outer circumference 122 and the outlet 126 as previously discussed. As shown in FIG. 4, the housing 116 can include a cavity 132, a groove 134 and an interior flange 136.

The cavity 132 can be formed by an interior side of the housing 116. The interior side can additionally form the groove 134 and the interior flange 136. The cavity 132 can be configured to receive the air filter 130. The air filter 130 can have a generally cylindrical shape with a hollow interior. The air filter 130 may include fibrous or porous materials for removing solid particulates (e.g., dust, pollen, mold, bacteria, etc.). For example, air filter 130 may include paper filters, foam filters, cotton filters, or the like. The air filter 130 can be positioned within the cavity 132 retained by abutting contact with the lid 118, the groove 134 and/or the interior flange 136. The air filter 130 can comprise a Caterpillar® model 2W4246 air filter, for example.

The air filter 130 can have an outer circumference 138, seals 140A and 140B, an inner circumference 142 and an interior cavity 144. The housing 116 can be spaced from the outer circumference 138 of the air filter 130 for at least a majority of the surface area of the outer circumference 138. The seal 140A can be on an opposing end of the air filter 130 from the seal 140B. The outer circumference 138 can extend between the seal 140A and the seal 140B. The seal 140A can be engaged and abutted by the lid 118. The seal 140B can be engaged and abutted by the groove 134. The inner circumference 142 can form the interior cavity 144. The inner circumference 142 can be engaged by the interior flange 136.

As shown in FIG. 4, the interior flange 136 can project into the cavity 132. The interior flange 136 can be positioned adjacent the outlet 126, which can be substantially aligned with the centerline axis CL of the housing 116. The interior cavity 144 can be in fluid communication with the outlet 126. The lid 118 can be selectively removeable from and attachable to the housing 116. The lid 118 can include a handle 146 to facilitate the removal to access the air filter 130 for service such as replacement.

As shown in FIG. 4, an outer part 133 of the cavity 132 can be positioned around all or part of the outer circumference 138 of the air filter 130. This can allow for flow of air around at least a portion of the outer circumference 138 before passing through the air filter 130 to the interior cavity 144. Referring now back to FIG. 4, the inlet 124 can be configured (positioned, shaped, etc.) relative to the air filter 130 such that the outer circumference 138 of the air filter 130 is oriented at an angle that is substantially tangent to a centerline axis CL2 of the inlet 124. This arrangement can allow for circulation of air from the inlet 124 around at least the portion of the outer circumference 138 prior to the air passing through the air filter 130 to the outlet 126. Put another way, the outer part 133 can extend circumferentially around an entirety or substantially an entirety of the outer circumference 138 of the air filter 130. This can allow for flow of the air from the inlet 124 around at least a portion of the outer circumference 138 prior to passage through the air filter 130.

Figure 4A:
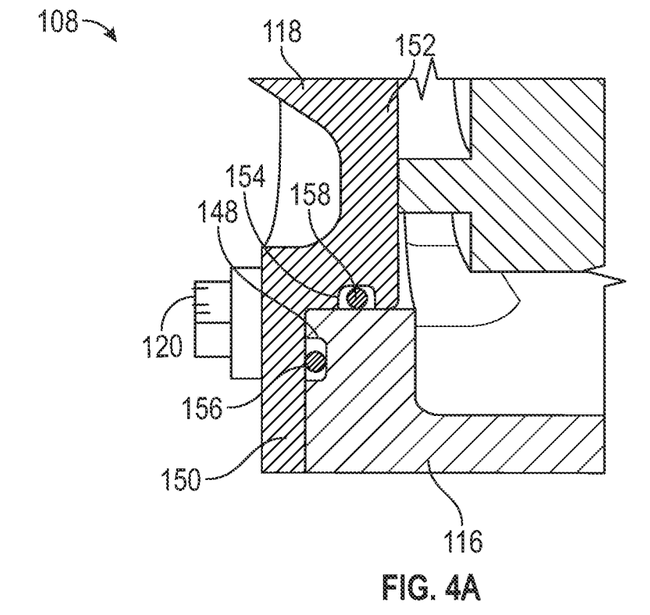
FIG. 4A is an enlarged cross-sectional view of a portion of a lid and a housing of the air cleaning apparatus of FIG. 4 in accordance with an example of this disclosure.

FIG. 4A is an enlarged view of part of the housing 116 and the lid 118 of the air cleaning apparatus 108. The housing 116 can include a first groove 148. The lid 118 can include a flange 150, a body 152 and a second groove 154.

As shown in FIG. 4A, a first O-ring 156 can be positioned in the first groove 148 and a second O-ring 158 can be positioned in the second groove 154. When the lid 118 is positioned down on the opening of the housing 116 and coupled to the housing 116 with the fasteners 120, the first O-ring 156 and the second O-ring 158 can together provide separate seals for the lid 118 with the housing 116. As shown in FIG. 4A, the first O-ring 156 can be arranged at an angle that is substantially 90 degrees to the second O-ring 158. This can be due to the shape of the lid 118 relative to the shape of the housing 116. More particularly, the lid 118 includes the flange 150, which projects outward from the body 152 and seals with the first O-ring 156. The body 152 extends in a direction substantially transverse to the flange 150 and seals with the second O-ring 158. The separate seals created by the arrangement discussed are robust and can withstand pressures of −35 kPa-g to +35 kPa-g within the cavity 132 (FIG. 4), for example.

FIG. 5 shows a portion of the housing 116 of the air cleaning apparatus 108 including the one or more ports 128A. A pressure relieve valve 160 is positioned in the port 128A and communicates with the interior of the housing 116, in particular, the cavity 132 (FIG. 4A). The pressure relieve valve 160 can be part of the ventilation system 102 (FIGS. 1 and 2). The pressure relief valve 160 can include a poppet configured for venting the cavity 132 (FIG. 4) should an overpressure event occur. According to one example, the pressure relieve valve 160 can have an actuation pressure of 2.5±0.5 psi. However, other valves with other actuation pressures are contemplated. As discussed, the one or more ports 128A (128B, 128C and 128D not shown) can be used with other valves, gauges and/or sensors if desired.

INDUSTRIAL APPLICABILITY

In operation, the engine 100 can be configured to combust fuel to generate power. While typically efficient, a small portion of the blow-by gases may escape the combustion chamber past the piston and enter undesirable areas of the engine such as the crankcase 104. As used herein, blow-by gas may include leakage of air, fuel, combustion gases and/or a mixture thereof. The air the ventilation system 102 supplies can act to ventilate the crankcase 104 and other components. This ventilation can dilute un-combusted fuel, explosive gases and/or volatiles such as found in the blow-by gas and/or fuel below a lower explosive limit so as to prevent or reduce the likelihood of an explosion within the engine 100. Additionally, dilution can reduce corrosion due to reducing the concentration of hydrogen sulfide, for example.

The present disclosure contemplates the ventilation system 102 can be in fluid communication with the crankcase 104 and can supply air to the crankcase 104 as a positive pressure system. The air supplied to the crankcase 104 and other components of the engine 100 can have a desired temperature range, a desired pressure range and a desired mass flow rate range. The air of the ventilation system 102 supplies can act to ventilate or purge the crankcase 104 and other components as discussed above.

Deviations from the desired pressure range such as from an over pressure event within the air cleaning apparatus 108 and/or the heat exchanger 110 or backup gases can potentially cause damage to the passage(s) 112B and 112C and the crankcase 104. Such overpressure events can occur, for example, if the air filter 130 becomes caked, clogged or otherwise functionally impaired so as to no longer function properly. The present air cleaning apparatus 108 provides several solutions to avoid over pressure occurring at the air cleaning apparatus 108 or in mitigating such over pressure.

The air entering the air cleaning apparatus 108 at the inlet 124 of the housing 116 is introduced substantially tangent to the outer circumference 138 of the air filter 130. Put another way, the outer circumference 138 of the air filter 130 is oriented at an angle that is substantially tangent to the inlet 124. This arrangement and including the outer part 133 of the cavity 132 around all or most of the outer circumference 138 allows for circulation of air from the inlet 124 around at least a portion of the outer circumference 138 prior to the air passing through the air filter 130 to the outlet 126. This arrangement avoids directing the air from the inlet directly at only a small area of the outer circumference 138 of the air filter 130, which could become clogged/caked more rapidly as compared with spreading the incoming air across a greater surface area of the outer circumference 138.

Additionally, the air cleaning apparatus 108 can include the pressure relief valve 160, which can be actuated should undesirable pressure build within the cavity 132. The excess pressure can be relieved via the pressure relief valve 160 and can leave the air cleaning apparatus 108 via the one or more ports 128A 128B and/or 128C. Use of the pressure relief valve 160 can be advantageous in providing sufficient mass flow rate to keep the fumes within the crankcase 104 below lower explosive limit while avoiding unwanted high pressure within the crankcase 104. High pressure within the crankcase 104 can lead to pressure spikes and other unwanted and potentially damaging pressure related outcomes within the engine 100. Sensors or gauges can be used with the one or more ports 128A, 128B and/or 128C and can provide a measure of the pressure drop across the air filter 130, which can allow for better understanding of when the air filter 130 needs to be serviced. Servicing can include removing the air filter 130 from the cavity 132, inserting a second air filter into the cavity and sealing the lid with the housing at the at least two locations. Positioning the air filter 130 within the cavity 132 and at least partially retained by the housing can include aligning the air filter with the groove 134 and the interior flange 136 of the housing 116 and inserting the air filter into the groove of the housing. The air cleaning apparatus 108 can be the air filter within the cavity and at least partially retained by the housing 116. The lid 118 can be sealed to the housing 116 at least two locations. The lid 118 can be removed from the housing 116 to access the air filter 130 within the cavity 132. The positioning the air filter 130 within the cavity 132 can include positioning the air filter such that an outer circumference of the air filter is oriented at the angle that is substantially tangent to the inlet 124, as discussed previously.

The air cleaning apparatus 108 additionally includes the housing 116 and the lid 118 with at least two grooves (148 and 154) and at least two O-rings (156 and 158). These provide the lid 118 with extra sealing capability relative to the housing 116. Furthermore, the air filter 130 itself is sealed with the lid 118 and/or within the housing 116 via the groove 134. This extra sealing of the lid 118 with the housing 116 and/or the air filter 130 with the housing 116 and lid 118 can provide desired sealing in case backflow gases enter the air cleaning apparatus 108. Such backflow gases can contain hydrogen/hydrogen sulfides that can be explosive and/or corrosive. Escape of such gases from the ventilation system 102 can be undesirable.

The above detailed description is intended to be illustrative, and not restrictive. The scope of the disclosure should, therefore, be determined with references to the appended claims, along with the full scope of equivalents to which such claims are entitled.

What is claimed is:

1. An apparatus for a ventilation system for supplying air to a crankcase of an internal combustion engine, the apparatus comprising:
    a housing forming a cavity and having an inlet and an outlet therein, wherein the inlet communicates with the cavity and is offset from a centerline axis of the housing,
    an air filter received by the cavity, wherein an outer circumference of the air filter is oriented at an angle that is substantially tangent to a centerline axis of the inlet;
    a lid attachable to and removable from the housing for selectively accessing the air filter; and
    a pressure relief valve coupled to the housing and in fluid communication with the cavity.

2. The apparatus of claim 1, wherein the pressure relief valve passes through a port in the housing.

3. The apparatus of claim 1, wherein the air filter has an inner cavity, and wherein the outlet is in fluid communication with the inner cavity and is substantially aligned with the centerline axis of the housing.

4. The apparatus of claim 1, wherein the air filter is retained within the cavity by at least one of a groove of the housing and a flange of the housing.

5. The apparatus of claim 4, wherein the air filter is at least partially retained within the cavity by abutting contact of the lid.

6. The apparatus of claim 1, further comprising a first O-ring and a second O-ring that together seal the lid with the housing, wherein the first O-ring is arranged at an angle that is substantially 90 degrees to the second O-ring.

7. The apparatus of claim 6, wherein the housing includes a first groove to receive the first O-ring and the lid includes a second groove to receive the second O-ring.

8. The apparatus of claim 7, wherein the lid includes a flange that seals with the first O-ring and a body that seals with the second O-ring.

9. The apparatus of claim 1, further comprising a flange coupled to the housing, wherein the flange is configured to mount to the internal combustion engine.

10. The apparatus of claim 1, wherein the housing is spaced from the outer circumference of the air filter to allow for circulation of air from the inlet around at least a portion of the outer circumference prior to the air passing through the air filter to the outlet.

11. A method of servicing an air filter for supplying air to a crankcase of an internal combustion engine, comprising:
 providing a housing forming a cavity and having an inlet and an outlet therein;
 positioning the air filter within the cavity and at least partially retained by the housing, wherein positioning the air filter within the cavity includes positioning the air filter such that an outer circumference of the air filter is oriented at an angle that is substantially tangent to a centerline axis of the inlet;
 providing a lid sealed to the housing at least two locations; and
 removing the lid from the housing to access the air filter within the cavity.

12. The method of claim 11, further comprising:
 removing the air filter from the cavity;
 inserting a second air filter into the cavity; and
 sealing the lid with the housing at the at least two locations.

13. The method of claim 11, wherein positioning the air filter within the cavity further includes abutting the air filter with the lid to at least partially retain the air filter.

14. The method of claim 11, wherein positioning the air filter within the cavity and at least partially retained by the housing includes aligning the air filter with a groove and a flange of the housing and inserting the air filter into the groove of the housing.

15. A ventilation system for a crankcase of an internal combustion engine, comprising:
 a low pressure, high mass flow air delivery system;
 an apparatus configured to receive air from the blower, wherein the apparatus includes:
  a housing forming a cavity and having an inlet for receiving the air and an outlet therein,
  an air filter received by the cavity; and
  a lid attachable to and removable from the housing for selectively accessing the air filter;
 a pressure relief valve in fluid communication with the cavity; and
 a heat exchanger configured to receive air from the outlet of the housing and heat or cool the air prior to passing the air to the crankcase;
 wherein the inlet communicates with the cavity and is offset from a centerline axis of the housing, wherein an outer circumference of the air filter is oriented at an angle that is substantially tangent to a centerline axis of the inlet, and wherein the housing is spaced from the outer circumference of the air filter to allow for circulation of air from the inlet around at least a portion of the outer circumference prior to the air passing through the air filter to the outlet.

16. The ventilation system of claim 15, wherein the air filter is retained within the cavity by at least one of a groove of the housing and a flange of the housing.

17. The ventilation system of claim 15, further comprising a first O-ring and a second O-ring that together seal the lid with the housing, wherein the first O-ring is arranged at an angle that is substantially 90 degrees to the second O-ring, wherein the housing includes a first groove to receive the first O-ring and the lid includes a second groove to receive the second O-ring.

18. The ventilation system of claim 15, wherein the pressure relief valve passes through a port in the housing.

* * * * *